United States Patent
Wang et al.

(10) Patent No.: US 6,594,623 B1
(45) Date of Patent: Jul. 15, 2003

(54) DETERMINING THREE-DIMENSIONAL ORIENTATION OF OBJECTS

(75) Inventors: Lei Wang, Shrewsbury, MA (US); Andrew Persky, Milford, MA (US); Lowell Jacobson, Grafton, MA (US)

(73) Assignee: Cognex Technology and Investment Corporation, Mountain View, CA (US)

( * ) Notice: Subject to any disclaimer, the term of this patent is extended or adjusted under 35 U.S.C. 154(b) by 0 days.

(21) Appl. No.: 09/475,084

(22) Filed: Dec. 30, 1999

Related U.S. Application Data

(60) Provisional application No. 60/164,957, filed on Nov. 12, 1999.

(51) Int. Cl.[7] .............................................. G06F 17/50
(52) U.S. Cl. .................. 703/1; 703/6; 703/7; 382/151; 382/154; 382/191; 382/195; 702/150; 702/151; 702/154; 702/95; 702/99
(58) Field of Search ............................. 703/6, 7, 2, 1; 382/151–154, 141, 191, 130, 156, 195, 190, 209, 103; 700/95–98, 91, 262, 213, 110, 264; 701/200, 216; 702/150–154, 95, 99

(56) References Cited

U.S. PATENT DOCUMENTS

| | | | | |
|---|---|---|---|---|
| 4,845,558 A | * | 7/1989 | Tsai et al. | 348/126 |
| 5,190,294 A | * | 3/1993 | Oka | 473/383 |
| 5,196,900 A | * | 3/1993 | Pettersen | 356/141.4 |
| 5,319,577 A | * | 6/1994 | Lee | 702/153 |
| 5,465,152 A | | 11/1995 | Bilodeau et al. | |
| 5,471,383 A | * | 11/1995 | Gobush et al. | 700/91 |
| 5,632,205 A | * | 5/1997 | Gordon et al. | 100/483 |
| 5,638,300 A | * | 6/1997 | Johnson | 702/153 |
| 5,777,244 A | * | 7/1998 | Kumagai et al. | 73/865.8 |
| 5,823,878 A | * | 10/1998 | Welch | 463/43 |
| 6,200,512 B1 | * | 3/2001 | Dewanjee et al. | 264/250 |
| 6,286,364 B1 | * | 9/2001 | Aoyama et al. | 73/65.03 |
| 6,338,684 B1 | * | 1/2002 | Winfield et al. | 473/378 |
| 6,442,292 B1 | * | 8/2002 | Otani et al. | 382/154 |

OTHER PUBLICATIONS

Kanatani et al., "Model based determination of object position and orientation without matching", Journal of information processing, 1988.*
http://callawaygolf.com/corporate/history.asp– History of Callaway Golf.*

* cited by examiner

*Primary Examiner*—Samuel Broda
*Assistant Examiner*—Kandasamy Thangavelu
(74) *Attorney, Agent, or Firm*—Russ Weinzimmer

(57) ABSTRACT

The three-dimensional orientation of a given object is determined. The given object may comprise an object having surface characteristics which provide poor contrast in representative images of the given object. In a specific embodiment, the object may comprise a golf ball. A model representation is obtained of a reference object, and a run-time image is obtained of the given object. From the run-time image, shape information is obtained for certain identified shapes collectively forming a subset of the visible shapes. The shape information is matched to a number of incremental poses of the model representation varying along three degrees of freedom.

12 Claims, 15 Drawing Sheets

DETERMINING THREE-DIMENSIONAL ORIENTATION OF OBJECTS

RELATED APPLICATION DATA

This application claims priority to Provisional Patent Application No. 60/164,957, filed Nov. 12, 1999, the content of which is hereby expressly incorporated by reference herein in its entirety.

COPYRIGHT NOTICE

The disclosure of this patent document contains material which is subject to copyright protection. The copyright owner has no objection to the facsimile reproduction by anyone of the patent document or the patent disclosure, as it appears in the United States Patent and Trademark Office patent file or records, once a patent is issued on this application, but otherwise reserves all copyright rights whatsoever.

BACKGROUND OF THE INVENTION

1. Field of the Invention

Aspects of the present invention relate to certain machine vision techniques and certain automated processes for manipulating physical objects.

2. Description of Background

It is difficult to precisely determine the orientation within three degrees of movement of certain three-dimensional objects having surface features which provide low contrast when an image is taken thereof. For example, golf ball manufacturers have attempted to produce automated systems that determine the orientations of randomly oriented golf balls, so that during the manufacturing process the golf balls can be re-orientated to all have the same orientation. The balls are re-orientated so markings can be uniformly placed at the same location on each ball. Currently, this task is performed manually. Multiple human operators, stationed at various machines through a given plant, re-orient the balls by hand.

There is a need for an automated system which can automatically identify the particular orientation of a given golf ball within three-degrees of freedom, and can produce a resulting signal to control a repositioning of the given golf ball. Such a system would provide substantial advantages, including reducing the costs of and speeding up the manufacturing process.

The patterns of dimples of a given golf ball may vary in certain respects. For example, Titleist® golf balls have dimples throughout their surface, with one dimple centered at the north pole of the ball and another dimple centered at its south pole. Other dimples, not at the north and south poles, are typically surrounded by six equally spaced dimples. The top hemisphere mirrors the lower hemisphere of the ball. In addition, the upper hemisphere and the lower hemisphere each have a given pattern, which repeats itself. Other types of golf balls may not have the same types of patterns.

Because of the lack of uniformity in the surface pattern, many professional golfers will position a golf ball with a certain orientation on the tee before each drive. For this reason, for certain types of professional balls, golf ball manufacturers will consistently place printed matter (a logo, characters, and/or graphics) at a certain location on the surface of the golf ball to denote its orientation.

Attempts have been made to identify the orientation of a golf ball by spinning each ball in front of a line scan camera. The resulting sinusoidal waveform is analyzed in an attempt to determine the orientation. The system tries to identify the equator of the ball, but encounters problems due to the poor contrast produced by the surface features of the ball. Such poor contrast may be due to, for example, the white-on-white characteristics of the ball and due to the fact the typography of the ball changes only slightly.

SUMMARY OF THE INVENTION

The present invention is provided to improve upon automated techniques for ascertaining the orientation of a three-dimensional object along three degrees of freedom. A system may employ such techniques in order to reorient the object in automated fashion, for example, using a repositioning system. Accordingly, in accordance with at least one aspect of the invention, a method may be provided for determining the three-dimensional orientation of a given object. The object may comprise a mass-produced object which is inspected before packaging. Before the ball can be compared to a model, for inspection, its orientation must be ascertained. The three-dimensional orientation may be determined in order to allow the placement of a marker at a predetermined position on the outer surface of an object. By way of example, the object may comprise a professional-class golf ball. A model representation of a reference object is obtained. The model representation may comprise information concerning a reference orientation of the reference object and information representing patterns of visible shapes in relation to the reference orientation. In a specific embodiment, the visible shapes may comprise dimples of a golf ball. The reference orientation may comprise the north or south pole of a golf ball.

A run-time image of the given object being inspected is obtained. From the run-time image, shape information is obtained for certain identified shapes collectively forming a subset of the visible shapes on the given object. The shape information may include, for a given identified shape, a location along three dimensions of the given identified shape as well as the size of the given identified shape. In the case of dimples on a golf ball, the location of a given dimple may be identified with the use of a vector originating at the center of the golf ball and intersecting the center of the dimple. The size of the dimple may be reflected by the magnitude of the vector representing the dimple's diameter. The shape information may be placed into vectors of a run-time model. The shape information is matched to a number of incremental poses of the model representation, varying along three-degrees of freedom. In matching the shape information to the poses of the model representation, both coarse matching and fine matching may be performed.

The coarse matching of the shape information may comprise matching that information to a number of candidate matching poses of the model representation from among a larger number of incremental poses of the model representation varying along three degrees of freedom. Specifically, the coarse matching may comprise: (i) comparing the shapes within the subset with nearby pose shapes from poses of the model representation; (ii) for the subset of shapes, generating scores indicative of respective distances between the shapes and the nearby pose shapes; and (iii) comparing the scores among poses to determine a closest of the poses which comprise the candidate matching poses.

Fine matching may involve fine matching the shape information to determine a precise matching pose. Specifically, the fine matching may comprise comparing the shapes within the subset with corresponding pose shapes of a given candidate matching pose to determine an error value, and adjusting the given candidate matching pose along three degrees of freedom to reduce the error value to below a predetermined level.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present invention throughout the several views, and wherein.

DETAILED DESCRIPTION

Figure 1:
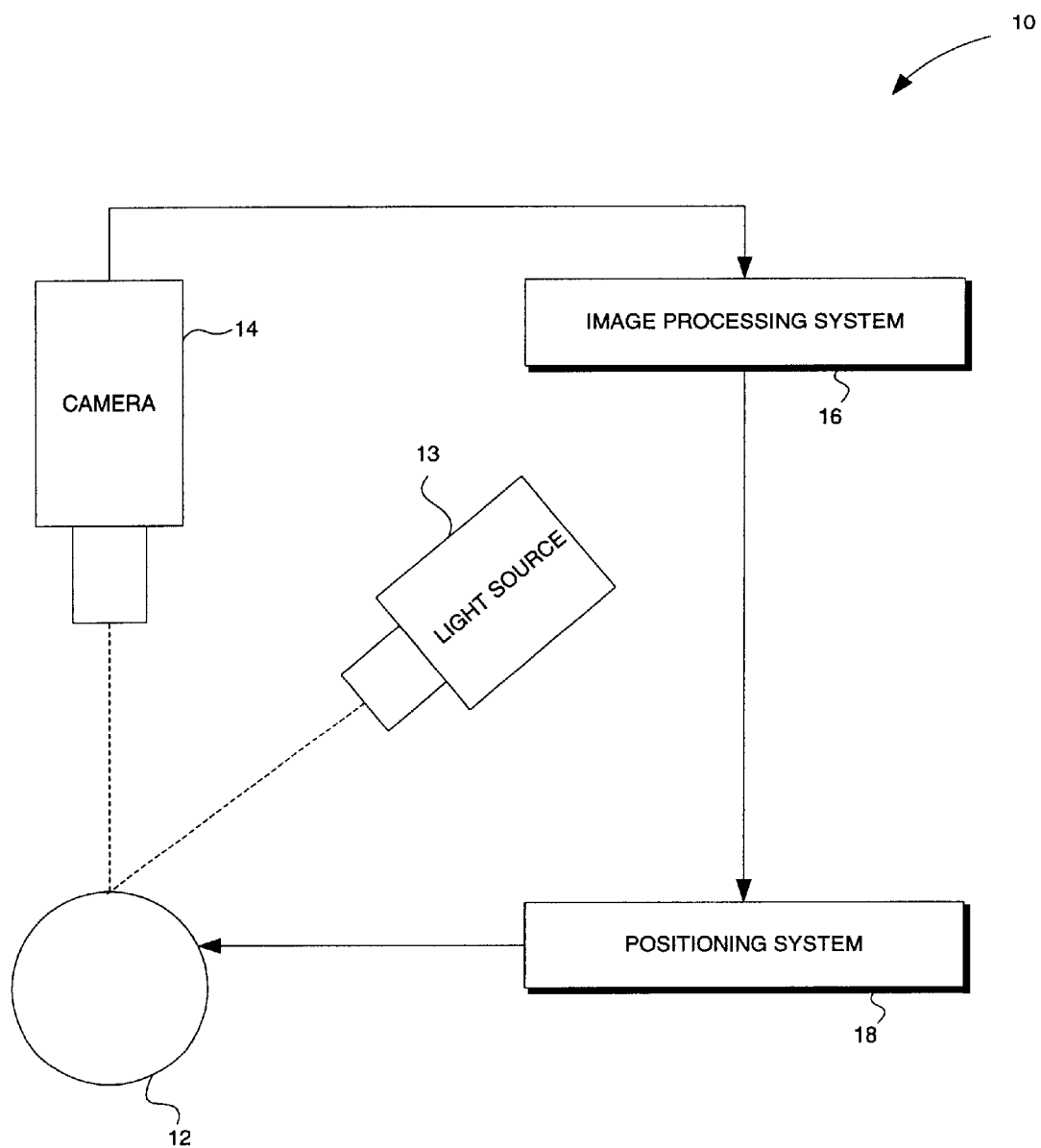
FIG. 1 is a block diagram of an automated repositioning system in accordance with one illustrated embodiment of the present invention.

A given object may be inspected in order to ascertain its orientation along three degrees of freedom. Such inspection and resulting determination of the orientation of a such a given three dimensional object may be performed by a system as shown in FIG. 1, or a sub-part thereof. In addition, such a process may be performed by a method. An implementation of the invention may comprise a system, a subsystem, a method, or an article of manufacture. The article of manufacture may comprise a machine-readable medium comprising structures which, when read by a machine, cause a given system or machine to take the form of a given system or subsystem, or to perform the acts of a given method.

The processes and system parts disclosed herein may involve determining a three-dimensional orientation of a given object which is three-dimensional, and which has an outer surface having repeating patterns of visible shapes. In the specific illustrated embodiment, the object comprises a golf ball. In any event, whether the object is a golf ball or another three-dimensional object, the system features and processes may be particularly suitable for mass-produced objects which are inspected before packaging in order to determine that such objects are defect-free or in order to place certain printed matter at predetermined positions on the outer surface of such an object. The embodiment disclosed herein is particularly useful for inspecting objects having surface characteristics (typography) which provide poor contrast in representative images (e.g., digital pictures—in color or gray-level pixels).

Referring now to the drawings in greater detail, FIG. 1 shows an automated repositioning system 10. The illustrated system 10 comprises a camera 14 connected to an imaging processing system 16, which is in turn coupled to a positioning system 18. Positioning system 18 is operatively coupled to a given object 12, which, in the illustrated embodiment, comprises a golf ball.

Positioning system 18 comprises mechanisms for positioning golf ball 12 in any desired orientation. By way of example, positioning system 18 may comprise a pair of stepping motors coupled to orthogonal rollers which are in operative contact with different respective portions of golf ball 12. Each of the rollers may be independently rotated to cause golf ball 12 to rotate along two different rotational directions, the collective movement allowing the orientation of golf ball 12 to be controlled along three degrees of movement. A light source 13 is directed at a front surface of golf ball 12, so that an image can be retrieved off a top portion of golf ball 12 by camera 12. In the illustrated embodiment, light source 13 is directed at the front surface of golf ball 12 at an angle, so that deflected light will enter the lens of camera 14. In the specifically-illustrated embodiments, by way of example, light source 13 may comprise an LED spotlight which directs a light beam toward the top/front of golf ball 12 at an angle of eighty (80) degrees from the axis of the camera.

Camera 14 may comprise a digital camera, or any type of image-taking device which will produce a signal representative of an image of the given object. The image may be a gray-level image, or it may be a color image. In the illustrated embodiment, the resulting image comprises a two-dimensional gray-level image.

Generally, in operation, automated repositioning system 10 obtains a run-time image of the given object 12 with the use of camera 14, and forwards that image to image processing system 16. Image processing system 16 performs orientation inspection processing on the run-time image, and as a result of such processing, produces position information which is input to positioning system 18. In response to receiving such position information, positioning system 18 will manipulate the given object 12 to be in certain desired orientation along three degrees of freedom.

Figure 2:
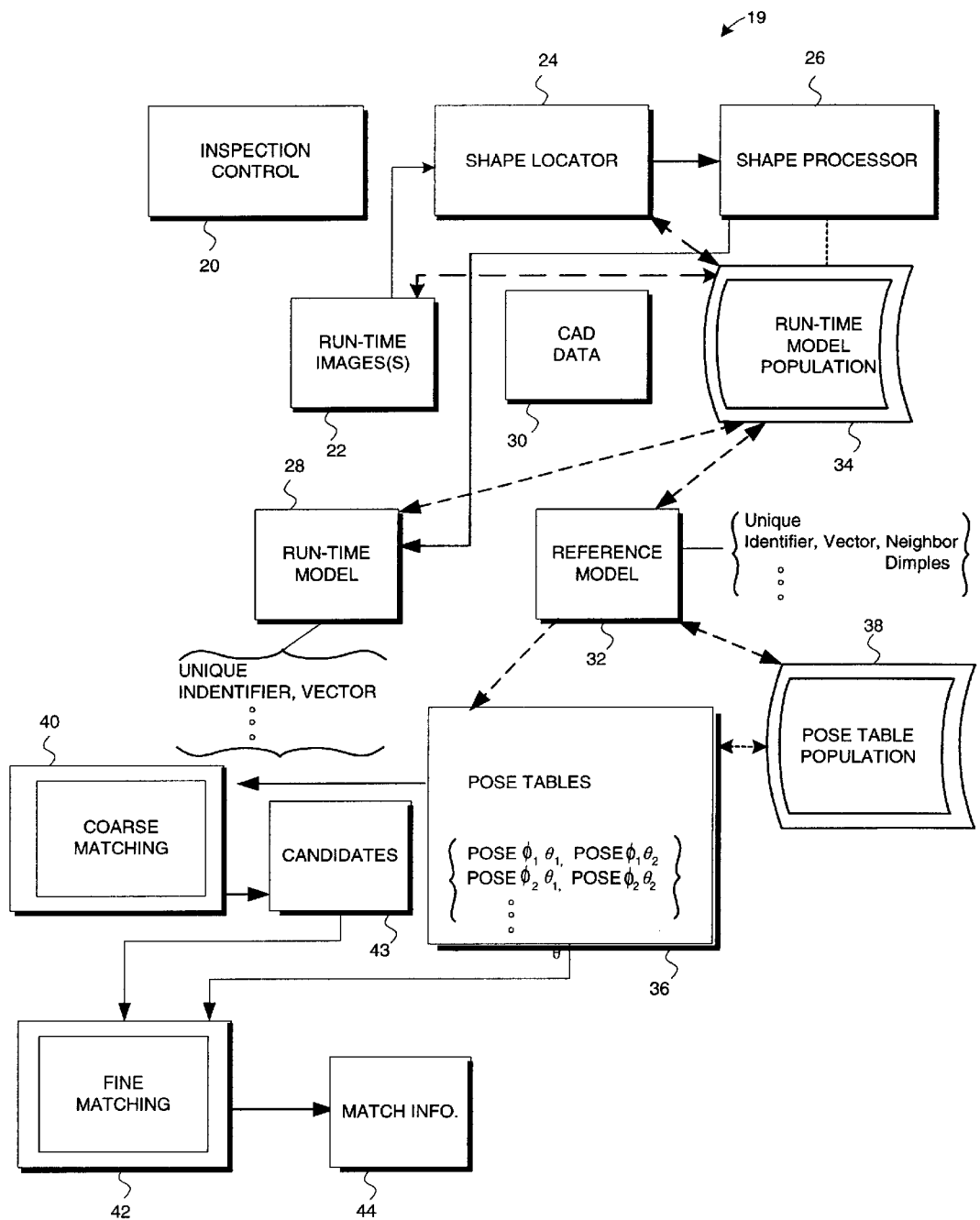
FIG. 2 is a block diagram of a portion of an image processing system.

FIG. 2 is a block diagram of an inspection portion of the image processing system 16 shown in FIG. 1. An inspection control mechanism 20 is provided which controls various other mechanisms in order to produce certain position information concerning the present orientation of the golf ball 12. The inspection sub-system 19 comprises, in addition to inspection control mechanism 20, a number of components, the operation of which is controlled by inspection control mechanism 20. Those components include one or more run-time images 22, a shape locator 24, a shape processor 26, a run-time model 28, CAD data 30 and a reference model 32. A run-time model population mechanism 34 is operatively associated with run-time images 22, shape locator 24, shape processor 26, CAD data 30 and reference model 32, as well as run-time model 28, and performs the process illustrated in FIGS. 4A–4C, in order to populate run-time model 28 as well as perform other acts.

The illustrated inspection sub-system 19 further comprises pose tables 36, a pose table population mechanism 38, a coarse matching mechanism 40, a fine matching mechanism 42, candidates 43 and match information 44.

Figure 3:
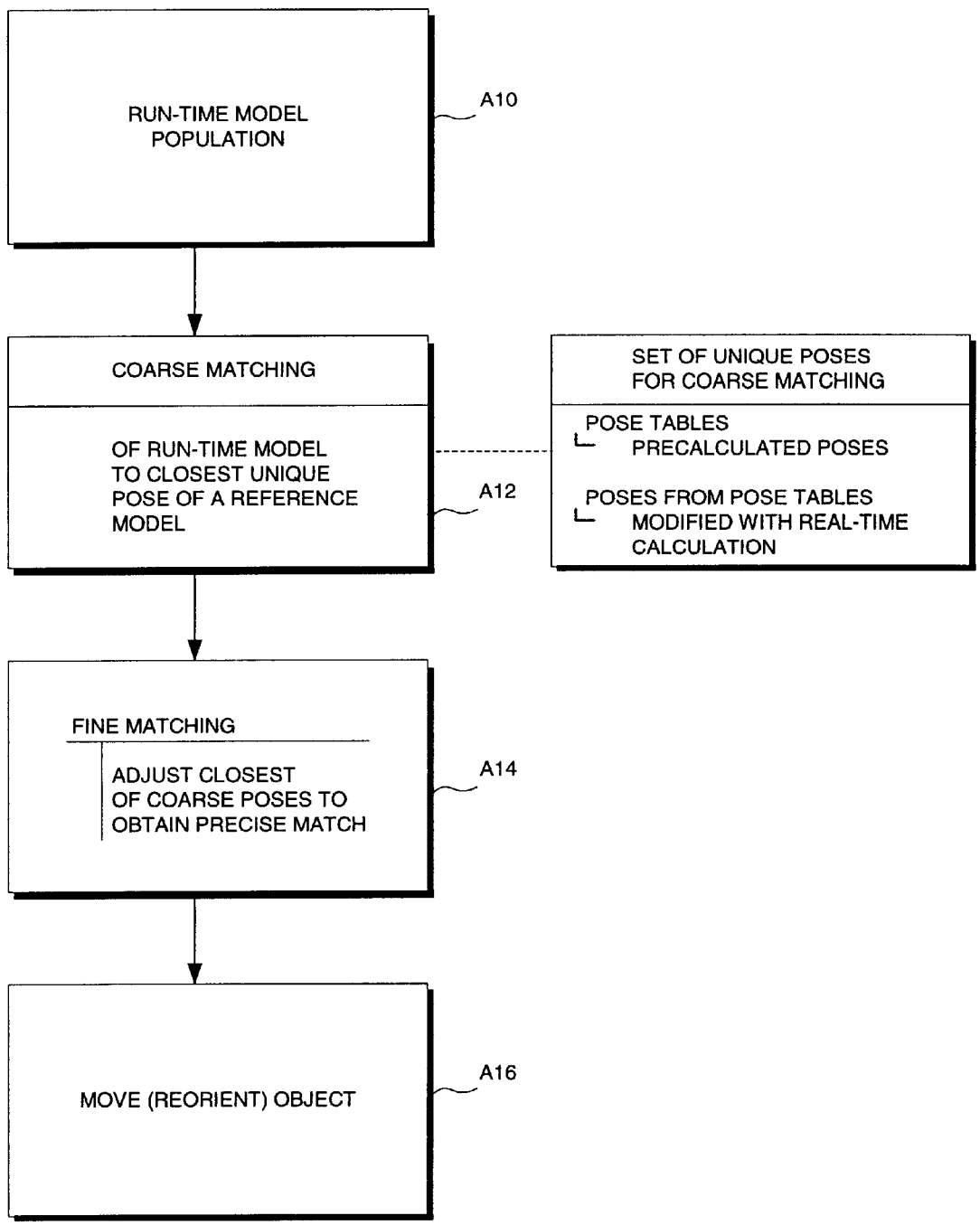
FIG. 3 is a flow chart of an object re-orientation process.

The inspection sub-system 19 shown in FIG. 2, when in operation, forms part of an object re-orientation process as shown in the flow chart of FIG. 3. Accordingly, as shown in FIG. 3, in a first act A10, run-time model population mechanism 34 of the sub-system shown in FIG. 2 is operated in order to populate run-time model 28. In the illustrated embodiment, the run-time model comprises a data structure made up of an array, where each element of the array comprises a set of data. Each set comprises a unique identifier for a given dimple and a vector. The direction of each vector connotes the position of the center of a given dimple (i.e., the point at which a line coinciding with the vector intersects the surface of the ball is the center of that dimple). The magnitude of the vector connotes the size of the dimple. In the illustrated, the magnitude corresponds to the diameter of that dimple. In populating the run-time model 28, shape information is obtained from run-time image(s) 22, for certain identified shapes collectively forming a subset of the total set of visible shapes on the outer surface of the golf ball (or another type of given object being inspected). In the illustrated embodiment, the visible shapes are dimples of a golf ball.

In a next act A12 of the object re-orientation process, a coarse matching is performed to match the run-time model to a closest unique pose of the reference model, with the use of a coarse matching mechanism 40 in connection with pose tables 36. This involves matching the run-time model to a unique pose, which can be one of many poses throughout the full range of poses in which the reference model can be oriented. Each unique pose is defined by a pre-calculated pose from a pose table, modified with a real-time calculation by rotating the run-time model in relation to the pre-calculated pose along a third degree of freedom.

After act A12, in A14 a fine matching process is performed, in which the closest of the coarse poses identified in the coarse matching is adjusted in order to obtain a precise match with the run-time model. Subsequently, in an act A16, the object is re-oriented by positioning system 18.

Figure 4A:
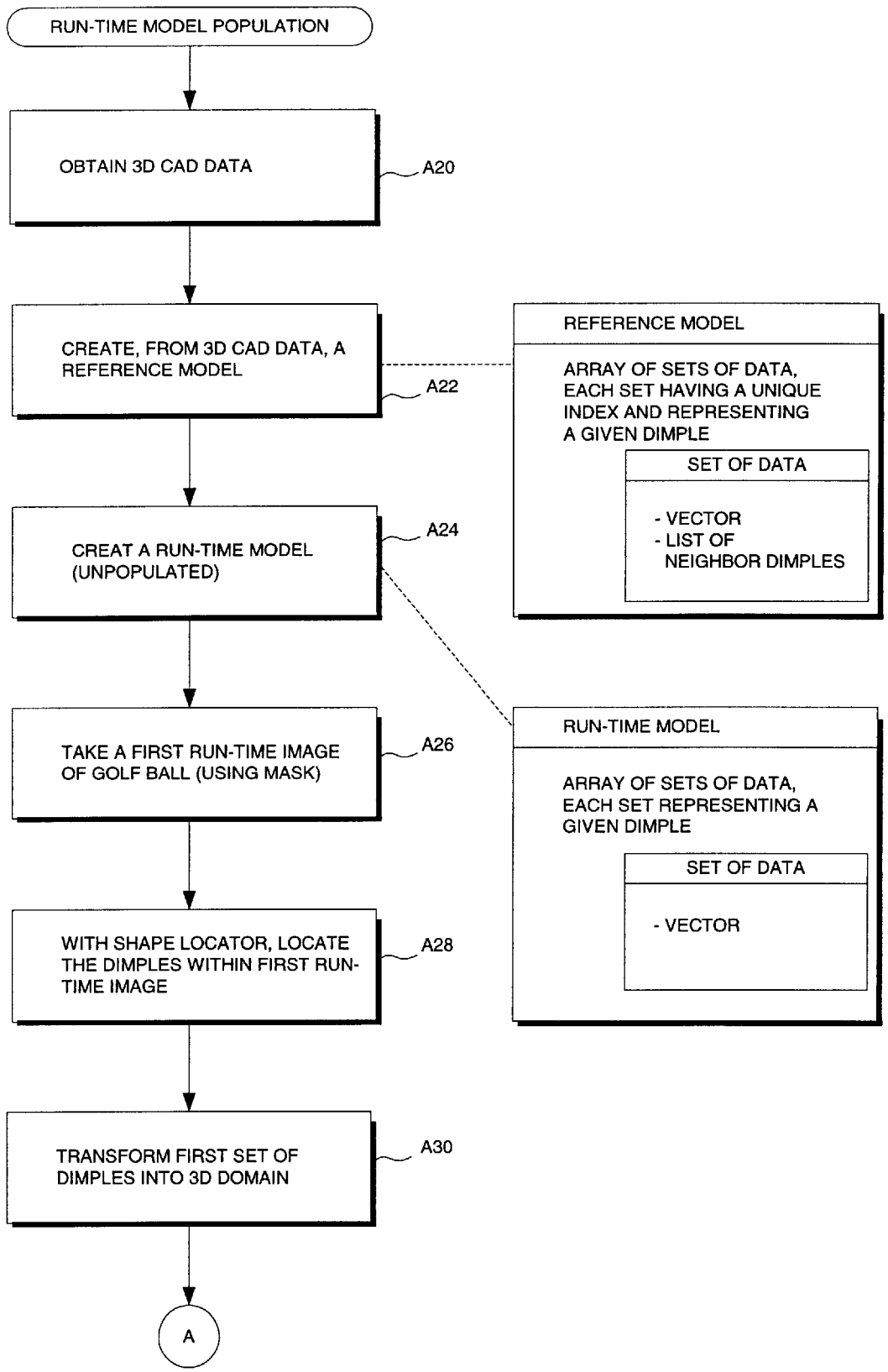
FIGS. 4A–C illustrate a flow chart of a run-time model population process.
Figure 4B:
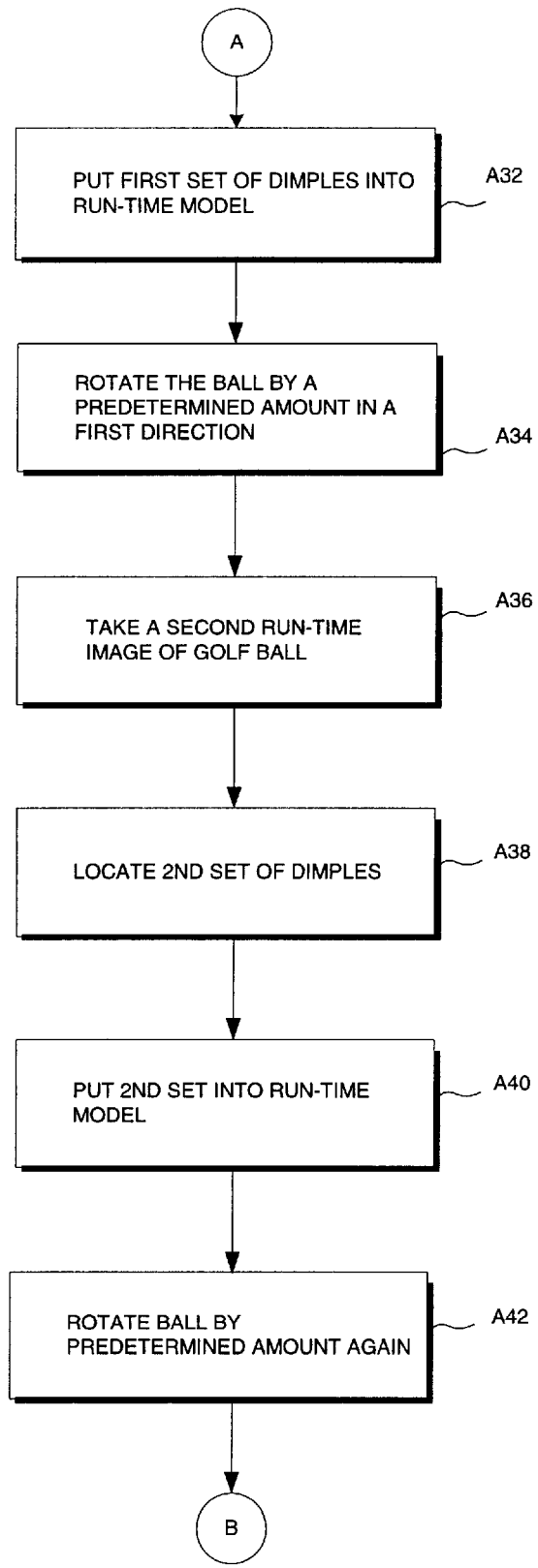
Figure 4C:
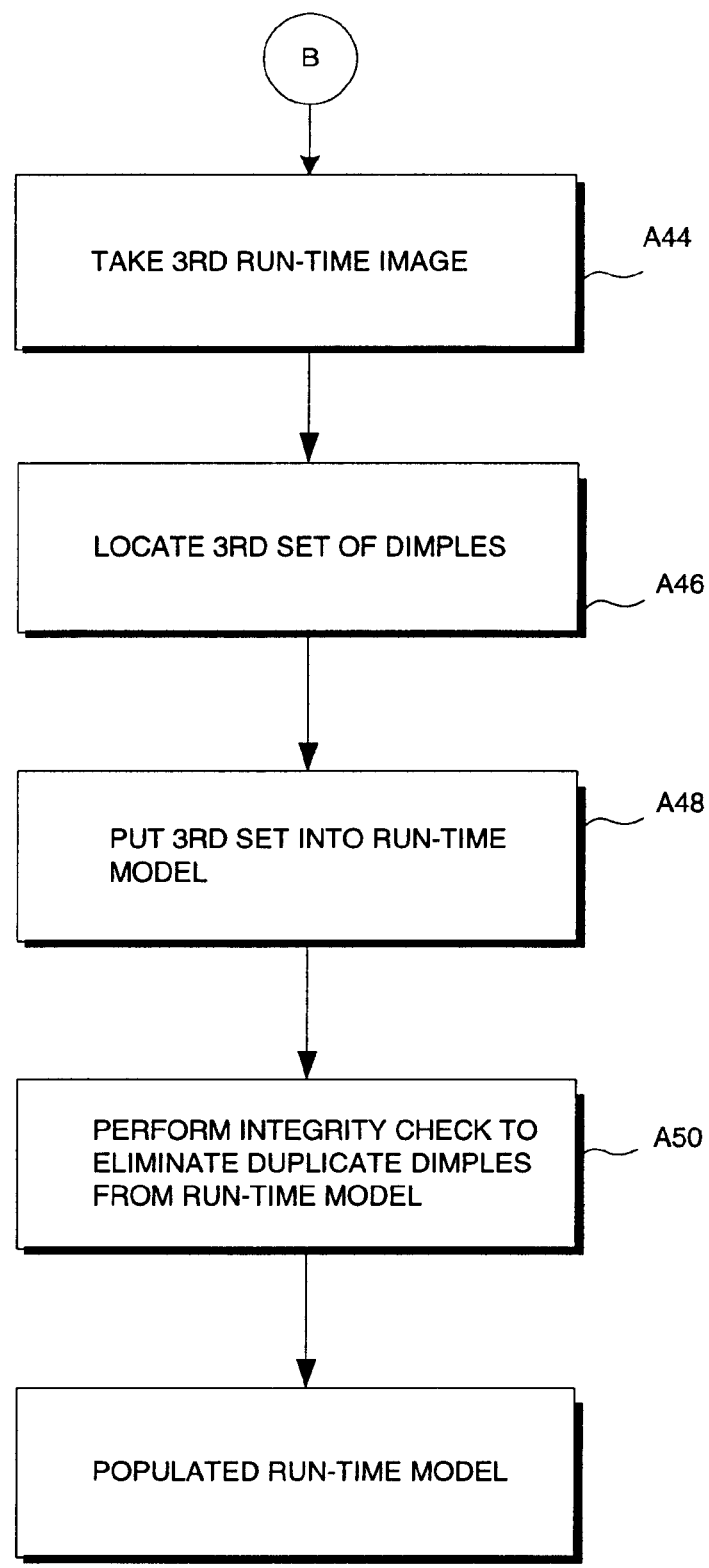

FIGS. 4A–4C show a flow chart of a run-time model population process per the illustrated embodiment, for populating the run-time model with a subset of the dimples on the outer surface of the golf ball.

In a first act A20, three-dimensional CAD data is obtained which describes a reference golf ball. In a next act A22, a reference model is created from the 3-D CAD data. In the illustrated embodiment, the reference model comprises an array of sets of data. Each set of reference model data has a unique index identifying a given dimple as well as other information representing that given dimple. Specifically, a set of data may comprise a vector indicating the position within the outer spherical surface of the golf ball at which the given dimple is located as well as a list of the neighbor dimples for that given dimple. The position of a given dimple is represented by the direction of the vector. The length of the vector identifies the size of the dimple. Accordingly, by knowing the direction of a given vector, and the diameter of the overall spherical shape of the golf ball, one can determine the intersection point of the vector through the spherical surface in order to obtain the precise center point for the given dimple.

In a next act A24, a run-time model is created of the golf ball. That model is not populated at this time. The run-time model comprises an array of run-time sets of data, each such set representing a given dimple. Specifically, in the illustrated embodiment, each such set of run-time data comprises a vector, the direction of which identifies the location of the dimple, and the magnitude of which indicates the size of that dimple. Since the run-time model is not populated at this time, it does not comprise any such data, but rather comprises only a data structure. However, it will have certain basic information, which is derived from other sources (e.g., the 3-D CAD data), i.e., the diameter of the golf ball.

Figure 8:
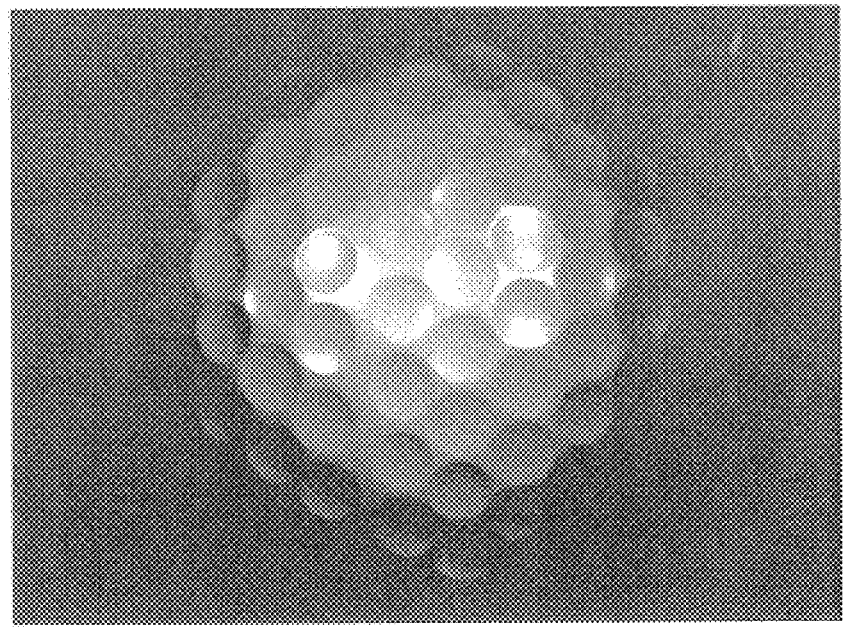
FIG. 8 shows part of a gray-level run-time image of a golf ball.
Figure 9:
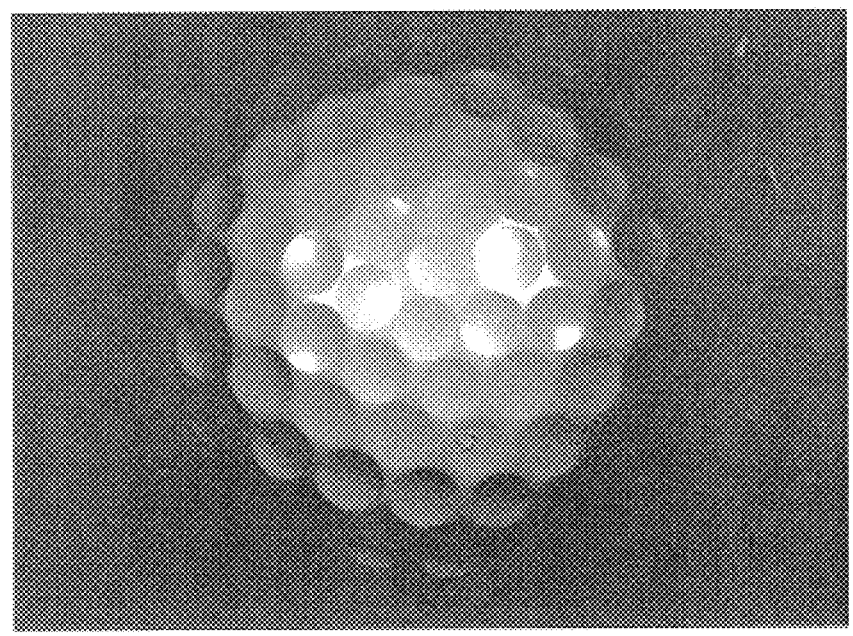
FIG. 9 shows part of a gray-level run-time image of a golf ball, looking directly down at the north pole thereof.

In a next act A26, a first run-time image is taken of the golf ball. The image shown in FIG. 8 is one example of such a run-time image. Part of that image is then obtained using a mask. Specifically, a mask is used to gather only such information from the run-time image which corresponds to dimples that are at least a predetermined distance away from the perimeter of the golf ball in the two-dimensional image. This allows elliptical representations of dimples which are very narrow and distorted to be absent from the run-time image, since it will be difficult for a shape locator to locate and identify such narrow elliptical shapes as dimples. If the object was a different type of object, a different type of mask may be appropriate, in order to exclude two-dimensional representations of shapes that are severely distorted and would be difficult to locate.

In a next act A28, dimples are located from the first run-time image with the use of shape locator 24. In a next act A30, a shape processor 26 is used to transform the first set of dimples obtained in act A28 into the three dimensional domain. In a next act A32, shape processor 26 will place the first set of dimples into the run-time model 28.

In act A34, golf ball 12 will be physically rotated by a predetermined amount along a first direction. By way of example, the golf ball may be rotated by thirty degrees. Then in act A36 a second run-time image is taken of the golf ball (again using an appropriate mask). In act A38, a second set of dimples is located using shape locator 24. In act A40, the second set is transformed into the three-dimensional domain and then converted into data and placed into run-time model 28. In act A42, the ball is again rotated by a predetermined amount in the same first direction. In act A44, a third run-time image is taken (using an appropriate mask). In act A46, a third set of dimples is located, which in act A48, is put into the run-time model.

In act A50, an integrity check is performed on the collective set of dimples placed in run-time model 28. This integrity check is designed to eliminate duplicate representations of the same dimples within run-time model 28. Any duplicates are eliminated, and the resulting populated run-time model is now available, which may comprise a limited number of dimples in relation to the total number of dimples throughout the outer surface of the golf ball. By way of example, the total subset collected and existing in the populated run-time model may comprise about thirty dimples out of a total possible number of 398 dimples for certain types of golf balls.

Figure 5:
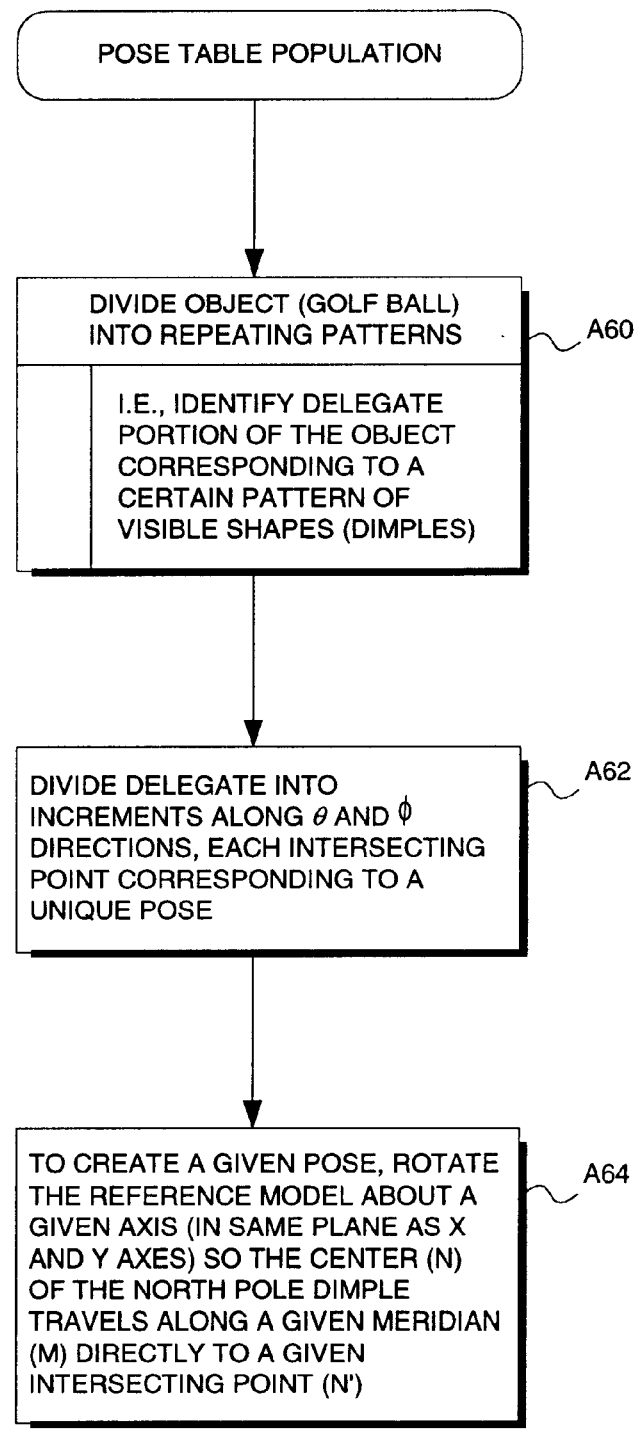
FIG. 5 is a flow chart of a pose table population process.
Figure 10A:
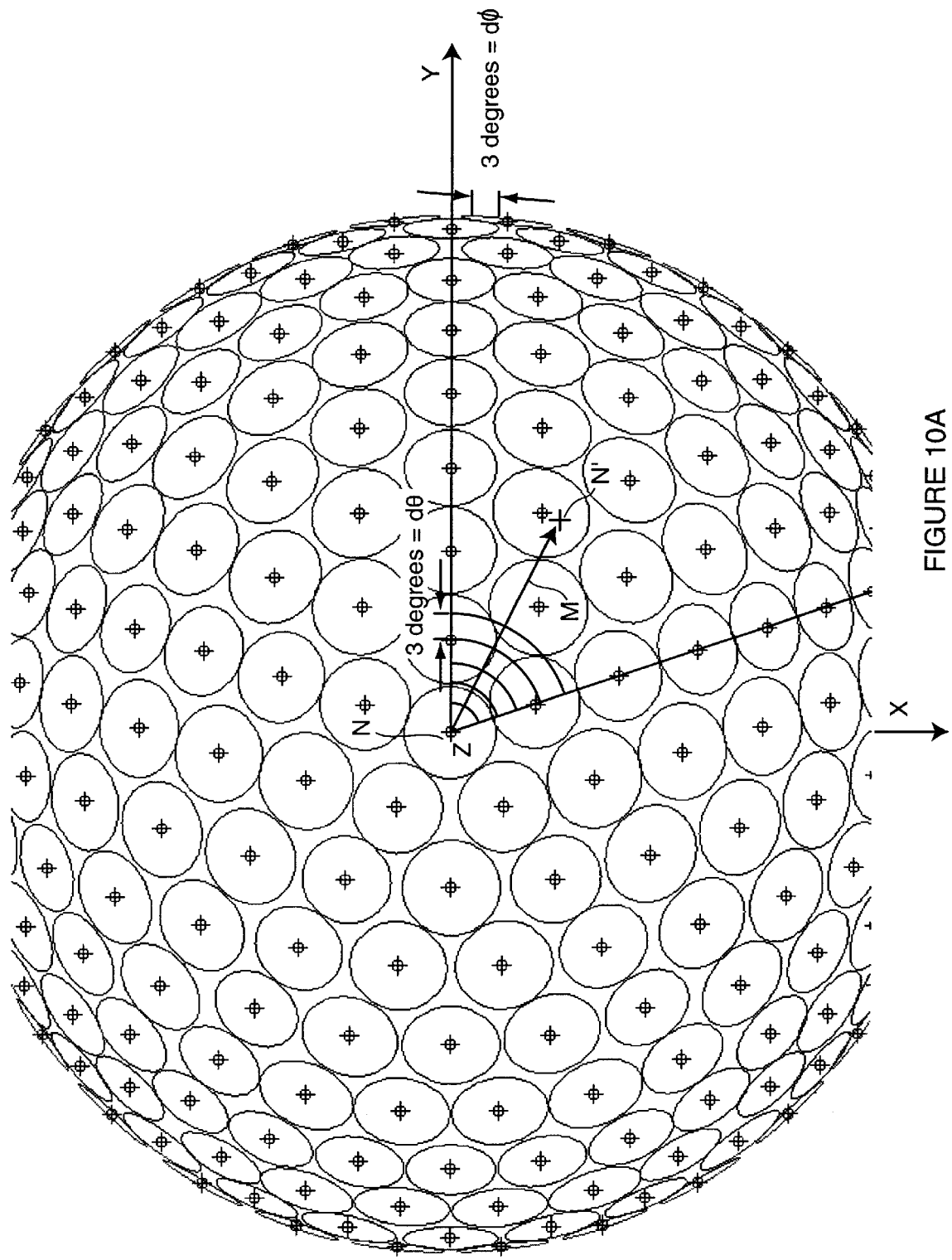
FIG. 10A is a simplified two-dimensional view of dimples of a golf ball, looking directly down at the north pole of such a golf ball.

FIG. 5 illustrates a flow chart of a pose table population process. In the first act A60, the object is divided into repeating patterns. That is, a delegate portion of the object is identified. That delegate portion corresponds to a certain pattern of dimples in the golf ball which is precisely repeated an integer number of times throughout the upper hemisphere of the golf ball. The delegate portion, in the illustrated embodiment, is the right lower-hand portion shown in FIG. 10, which comprises one-fifth of the upper hemisphere surface of the golf ball.

In a next act A62, the delegate is divided into increments along the $\theta$ and $\phi$ directions, defining intersecting points, each of which corresponds to a unique pose. Then, in act A64, a set of unique poses is generated, each unique pose corresponding to a given one of the intersecting points. To create a given pose, the reference model is rotated about a given axis (in the same plane as the X and Y axes), so that the center of the north pole dimple travels along a given meridian M (see FIGS. 10A and B) directly to a given intersecting point N'. Each pose table comprises information identifying the positions of all of the dimples for that given pose.

Figure 10B:
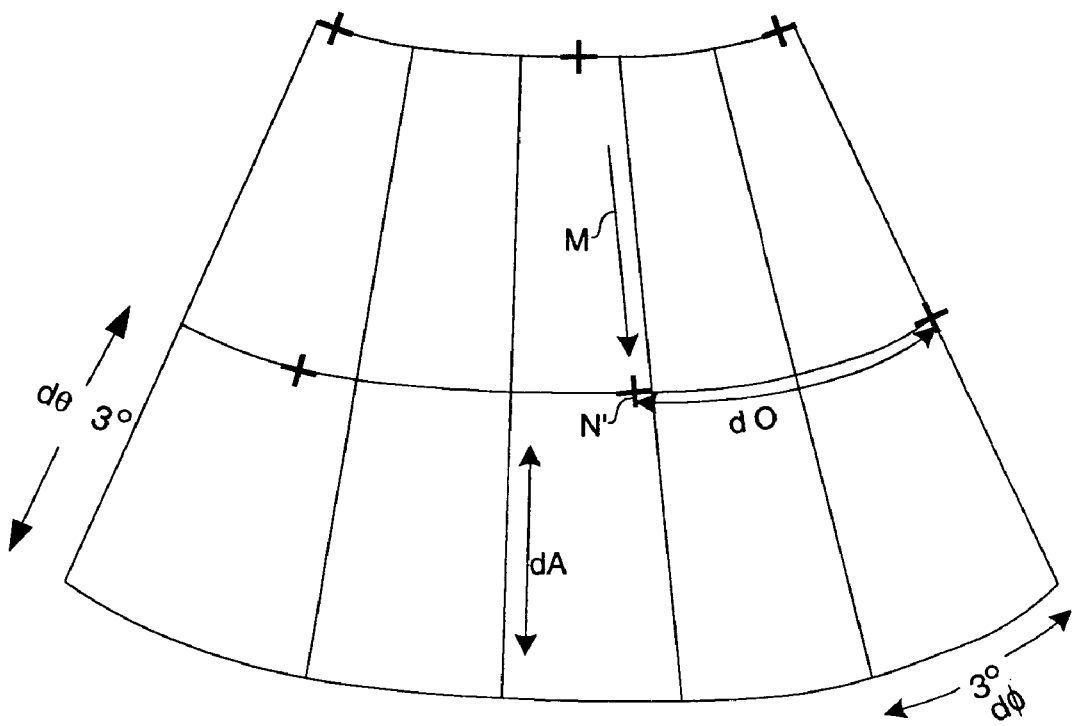
FIG. 10B is an enlarged view of part of the delegate portion of a golf ball.
Figure 11:
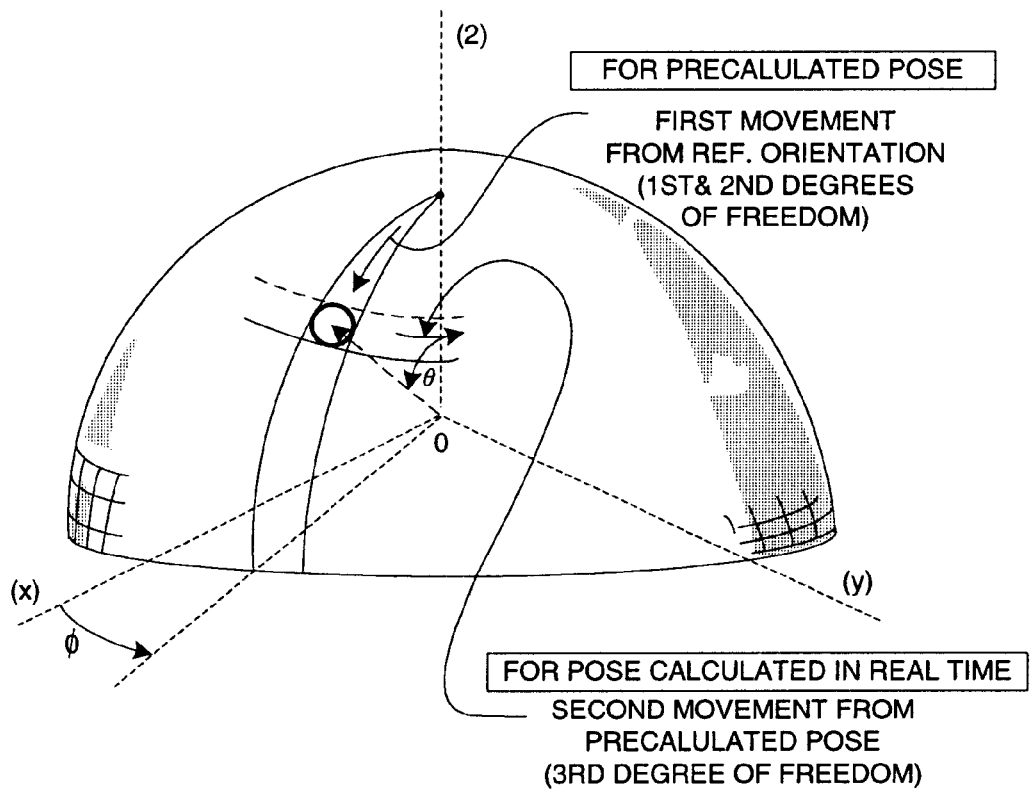
FIG. 11 is a perspective view of an upper hemisphere in relation to Cartesian and polar coordinates.

FIG. 10B is a blown-up view of part of an illustrative delegate portion. The increments along the θ and Φ directions may be in terms of constant incremental angles dθ (3 degrees) and dΦ (3 degrees), respectively. However, that would result in an overly high resolution as the delegate portion approaches its nadir, at the expense of memory space and computational resources. Thus, in the illustrated embodiment, in parts of the delegate portion closer to its peak/nadir, the increments along the Φ direction are increased. In the illustrated embodiment, the increments are in terms of equal incremental longitudinal distances dO (in the Φ direction) and incremental latitudinal distances dA (in the θ direction).

Figure 6A:
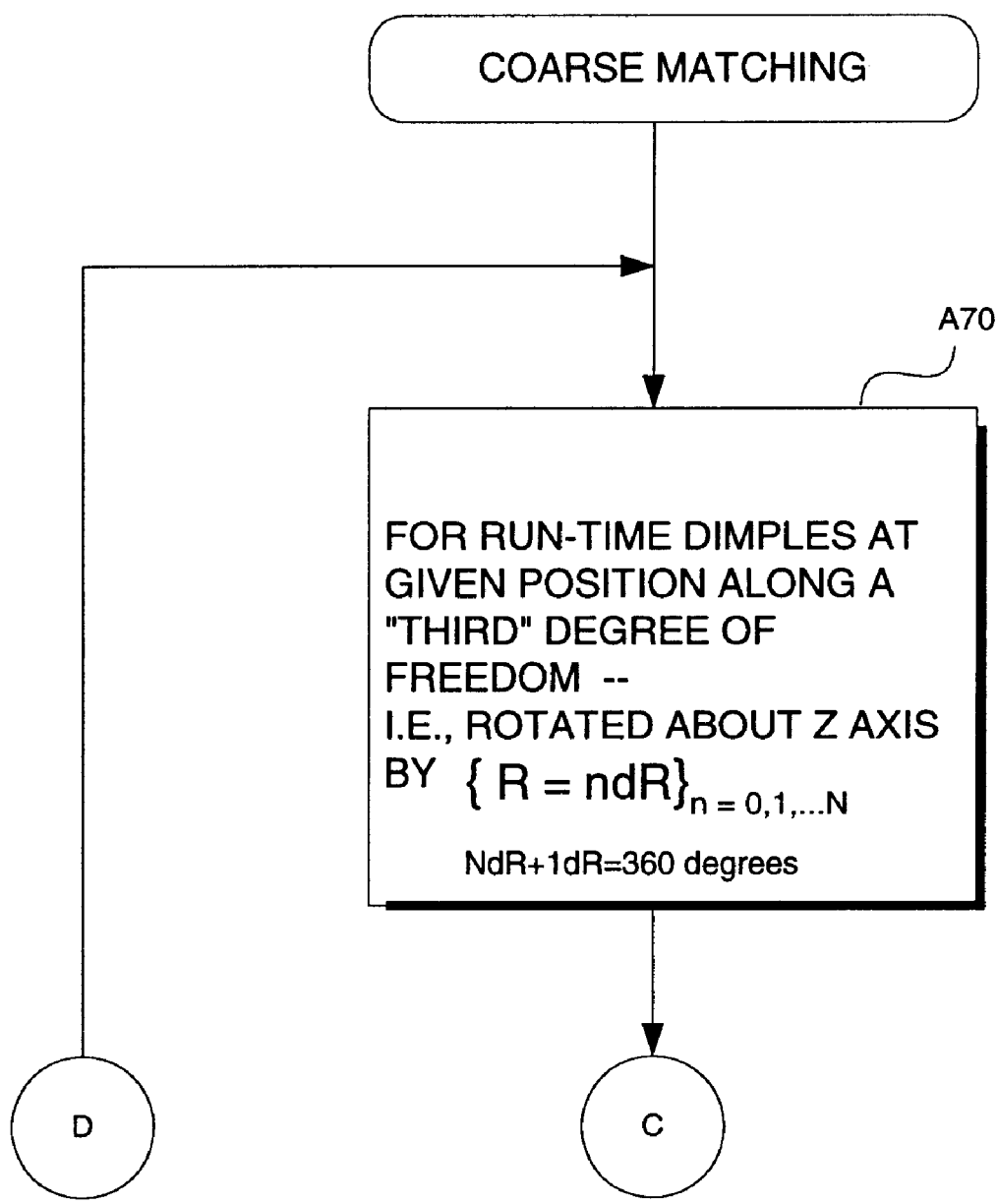
FIGS. 6A–6B illustrate a flow chart of a coarse matching process.
Figure 6B:
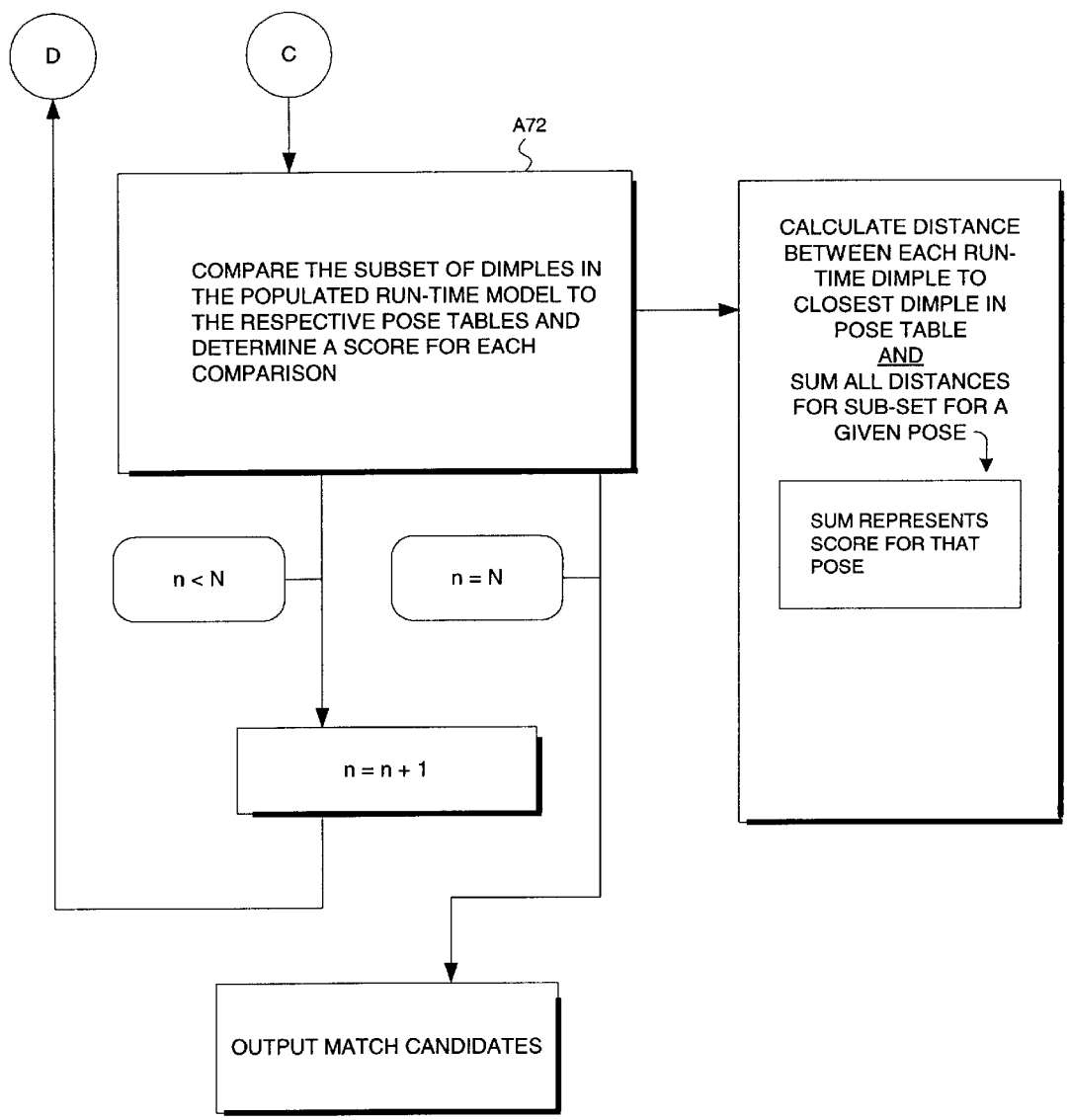

FIGS. 6A and 6B show a flow chart of the illustrated process for performing coarse matching. In a first act A70, the subset of the dimples in the populated run-time model is compared to the respective pose tables, and a score is determined for each comparison. Specifically, in a first act A70, a given set of run-time dimples is selected which corresponds to the run-time model at a given position along a "third" degree of freedom. This position corresponds to the run-time model rotated about the Z-axis by incremental amounts starting with zero degrees and increasing in increments throughout the 360 degrees above the Z-axis. A given position of rotation is defined as R=ndR, where n=01 . . . N and where Nd+1dR=360. In the illustrated embodiment, n=3°.

In a next act A72, the subset of dimples at the given position is compared to the respective pose tables, and a score is determined for each such comparison. Then, a determination is made as to whether n is less than N or is equal to N. If it is less than N, the value n will be increased by one, and the process will return to step A70. If n=N, all of the various positions of rotation of the run-time model have been compared to each of the pose tables; thus, the match candidates produced as a result of the coarse matching processes are output.

Figure 6C:
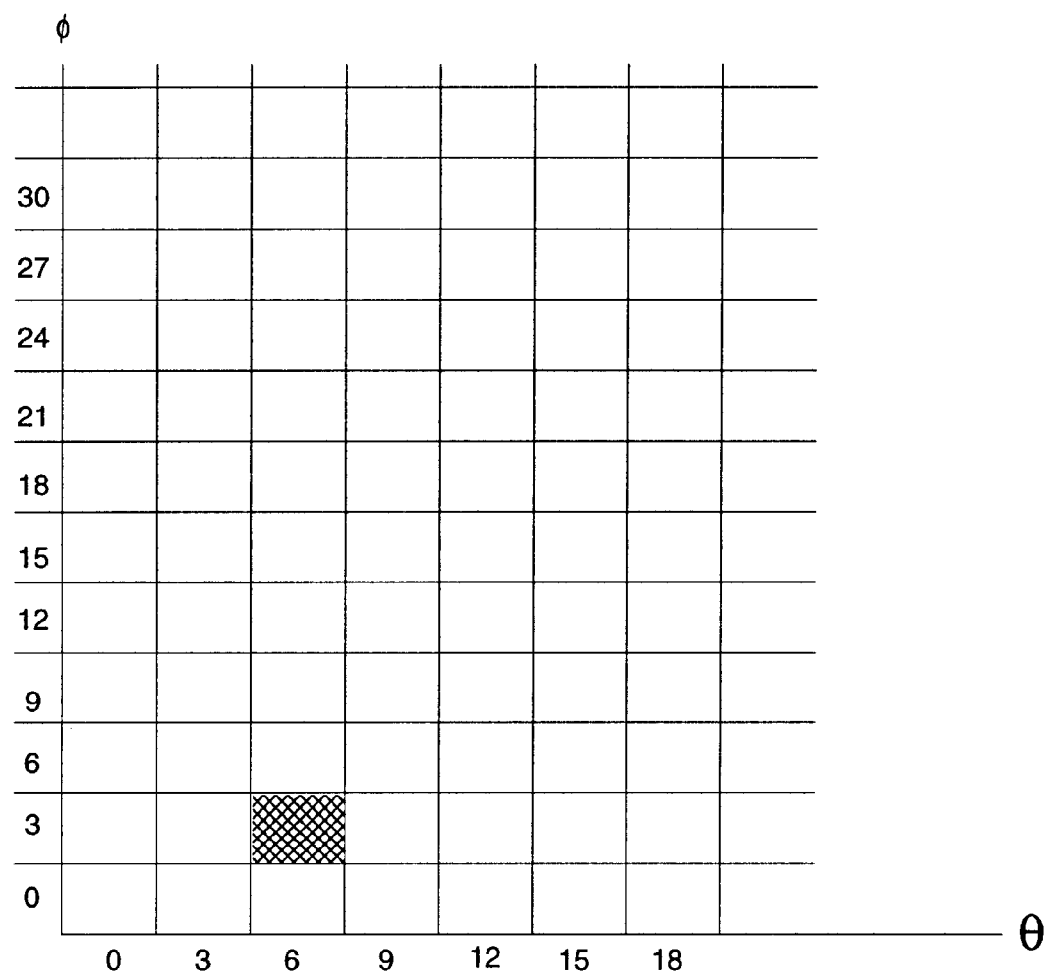
FIG. 6C graphically illustrates a pose comparison matrix.

When comparing a given subset of dimples from the run-time model to a given pose table, a distance is calculated between each run-time dimple to the closest dimple in the pose table. In order to determine which dimple from the pose table is closest to a given run-time dimple, the run-time dimple may be compared to each and every one of the dimples in the pose table. However, this would require substantial memory and computational resources. Accordingly, in the illustrated embodiment, a lookup table may be provided, as illustrated in FIG. 6C. The illustrated lookup table comprises a matrix. Each dimple of a given pose is placed in the pose's corresponding lookup table. Accordingly, every pose table has a corresponding lookup table. The dimple is placed in the grid of the look-up table which has the best matching θ and ø values. Accordingly, a dimple in polar coordinates, having 2.7° in the ø direction and 6.5° in the θ direction will be placed in the grid identified with cross-hatching in FIG. 6C. The set of data provided in that location of the matrix will also comprise vectors, in polar coordinates, for a set of closest neighbors to that given dimple in the pose table, where the number of neighbor dimples provided may be equal to, for example, 6.

When a dimple is compared to a pose table in order to determine its closest dimple in the pose table, it is simply matched to a closest grid in the corresponding lookup table. The dimples assigned to that grid are then compared to the run-time dimple in order to calculate the smallest distance and thus identify the closest of the pose dimples.

Figure 7:
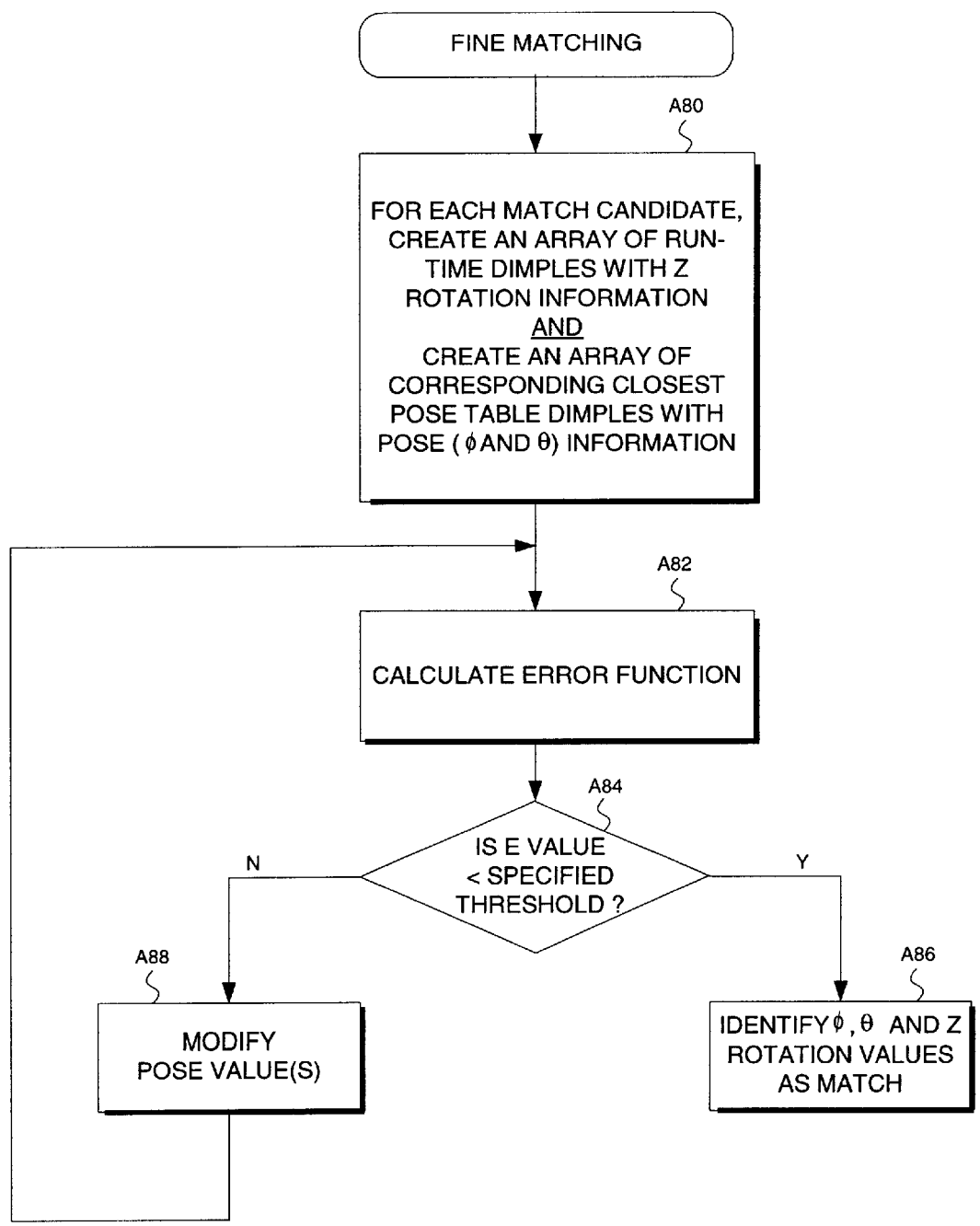
FIG. 7 is a flow chart of a fine matching process.

FIG. 7 is a flow chart of a fine matching process performed by the illustrated embodiment. In a first act A80, for each match candidate, which comprises a set of run-time dimples with Z rotation information, an array is created with the run-time dimples and corresponding Z rotation information. In addition, an array is created of corresponding closest pose table dimples, with their pose information (i.e., θ and ø values). In a next act A82, an error function is calculated. In the illustrated embodiment, this value comprises a square of the sum of the distances between each of the run-time dimples and their corresponding closest pose dimples. In a next act A84, a determination is made as to whether the calculated error value is less than a specified threshold, so as to be low enough to be negligible. If the error value is below that threshold, the process will proceed to act A86, at which point the pose values will be identified as corresponding to a match. If the error is substantial enough so that it is not negligible, the process will proceed to act A88, at which point one or more of the pose values (i.e., θ, ø and the Z rotation amount) will be modified and the process will return to act A82, at which point the error function will be recalculated.

In the illustrated embodiment, each vector, representing a given dimple, (collectively forming a model which graphically looks like a pincushion) is in the Cartesian coordinate, in ball coordinates (which means that the center of origin is at the center of the ball). Accordingly, a first dimple may be represented with the vector $(x_1, y_1, z_1)$ and a second vector representing a second dimple may be represented with the vector $(x_2, y_2, z_2)$. The first dimple may be a run-time dimple, while the second dimple is a dimple in a pose table. The distance between the two is the square root of $(x_1-x_2)^2+(y_1-y_2)^2+(z_1-z_2)^2$. In the illustrated embodiment, the square root is not taken of the sum of these squared values, to simplify the calculations involved. Note that the vectors in Cartesian coordinates do include information representative of the size of the dimples. That is, the magnitude of each vector is representative of the diameter of a given dimple. Therefore, the distance calculations will not only take into account how proximate a dimple is to another, but it will also take into account its relative size. When comparing the top eight candidates for purposes for fine alignment, the number one candidate is taken and compared to its corresponding pose table. If the fine alignment process is not successful for this given candidate, the fine alignment process will be repeated for the next best candidate produced by the coarse alignment process. If that candidate fails the fine alignment, the next candidate will then be used, and so on.

The fine alignment process will modify the pose values in order to reduce the error value to a negligible amount. Various types of known algorithms can be used in order to adjust parameters in this fashion in order to reduce an error function. For example, an algorithm disclosed in the book entitled "Numerical Recipes in C: The Art of Scientific Computing", by William H. Press, et al., Cambridge University Press (October 1992) may be utilized. The content of these sections of that reference are hereby expressly incorporated by reference herein in their entireties.

While the invention has been described by way of example embodiments, it is understood that the words which have been used herein are words of description, rather than words of limitation. Changes may be made, within the purview of the appended claims, without departing from the scope and spirit of the invention in its broader aspects. Although the invention has been described herein with reference to particular mechanisms, materials, acts, and embodiments, it is understood that the invention is not limited to the particulars disclosed. Rather, the invention extends to all equivalent structures, mechanisms, uses, and acts, such as are within the scope of the appended claims.

What is claims is:

1. A method for determining the 3-dimensional orientation of a given object, the method comprising:
   obtaining a model representation of a reference object, said model representation comprising information concerning a reference orientation of said reference object and information representing repeating patterns of visible shapes in relation to said reference orientation;
   obtaining a run-time image of said given object;
   from said run-time image, obtaining shape information for certain identified shapes collectively forming a subset of said visible shapes:
       performing a matching of said shape information to a number of incremental poses of said model representation varying along three degrees of freedom so as to determine the 3-dimensional orientation of the given object.

2. The method according to claim 1, wherein said given object comprises a mass-produced object.

3. The method according to claim 2, wherein said mass-produced object is inspected before packaging.

4. The method according the claim 2, wherein said mass-produced object comprises an object on which a marker will be placed at a predetermined position with respect to its orientation after the 3-dimensional orientation of the object is determined.

5. The method according to claim 1, wherein said given object has surface characteristics which provide poor contrast in representative images of said given object.

6. The method according to claim 5, wherein said given object comprises a golf ball.

7. The method according to claim 6, wherein said reference orientation comprises one of a north and south pole of a golf ball.

8. The method according to claim 1, wherein said shape information comprises, for a given identified shape, a location in three dimensions of the given identified shape and the size of the given identified shape.

9. The method according to claim 1, comprises placing said shape information for said subset into vectors of a run-time model.

10. The method according to claim 1, wherein said matching comprises:
    coarse matching of said shape information to a number of candidate matching poses of said model representation from among a larger number of incremental poses of said model representation varying along three degrees of freedom, the coarse matching comprising:
    (i) comparing the shapes within said subset with nearby pose shapes from the poses of said model representation,
    (ii) for the subset of shapes, generating scores indicative of respective distances between the shapes and the nearby pose shapes, and
    (iii) comparing the scores among poses to determine a closest subset of the poses which comprise the candidate matching poses; and
    fine matching of said shape information to determine a precise matching pose, the fine matching comprising:
    (i) comparing the shapes within said closest subset with corresponding pose shapes of a given candidate matching pose to determine an error value, and
    (ii) adjusting the candidate matching pose along the three degrees of freedom using the error value so as to provide the precise matching pose thereby determining the 3-dimensional orientation of the given object.

11. A system for determining the three-dimensional orientation of a given object, said system comprising:
    a population mechanism for populating a run-time model of the given object and a reference model, said reference model comprising information concerning a reference orientation of a reference object and information representing repeating patterns of visible shapes in relation to said reference orientation, and said run-time model comprising shape information for certain identified shapes collectively forming a subset of said visible shapes; and
    a matching mechanism for performing a matching of said shape information to a number of incremental poses of said reference model varying along three degrees of freedom so as to determine the 3-dimensional orientation of the given object.

12. Computer-readable media comprising certain information thereon, the certain information, when read by a machine, causing:
    obtaining a model representation of a reference object, said model representation comprising information concerning a reference orientation of said reference object and information representing repeating patterns of visible shapes in relation to said reference orientation;
    from a run-time image of said given object, obtaining shape information for certain identified shapes collectively forming a subset of said visible shapes; and
    performing a matching of said shape information to a number of incremental poses of said model representation varying along three degrees of freedom so as to determine the 3-dimensional orientation of the given object.

* * * * *